INVENTORS
NIELS W. HOLM
ROBERT D. JARRETT

3,390,099
STABILIZED RADIATION DOSIMETERS
Niels W. Holm, Roskilde, Denmark, and Robert D. Jarrett, Framingham, Mass., assignors, by direct and mesne assignments, to the United States of America as represented by the Secretary of the Army
Filed Sept. 15, 1965, Ser. No. 487,641
4 Claims. (Cl. 252—408)

ABSTRACT OF THE DISCLOSURE

A radiation dosimeter useful in the range of from 50,000 to 1,000,000 rads consisting of an air saturated solution of ferrous sulfate, cupric sulfate and sulfuric acid, which is stabilized against oxidation-reduction reactions which alter the optical density of the solution by irradiation of the freshly prepared solution by high energy ionizing radiation in the range of 200,000 to 400,000 rads.

---

Figure 1:
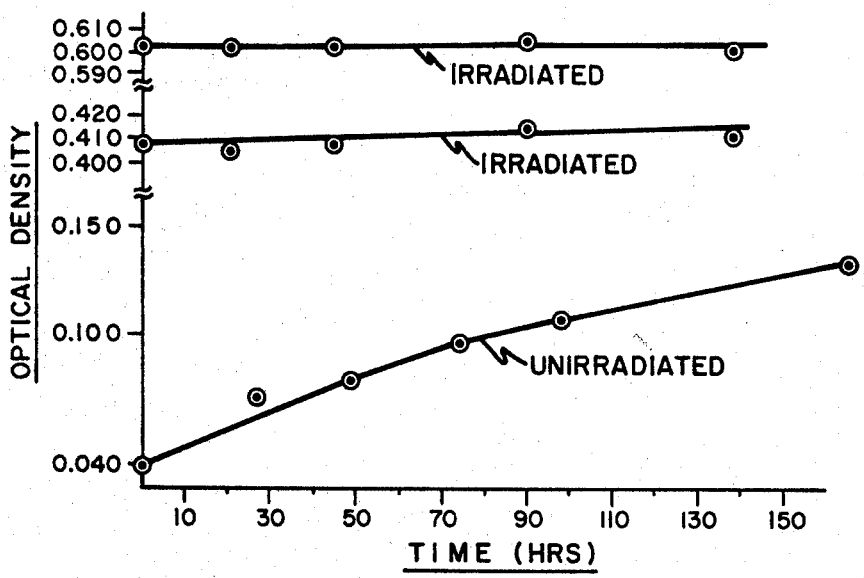

This invention relates to the stabilization of aqueous chemical solutions and, more particularly, to the stabilization of chemical solutions useful in radiation dosimetry.

High energy, ionizing radiation, i.e., radiation having an energy of at least 100,000 electron volts, is being used to an ever increasing extent for an ever widening number of industrial purposes. Among the more recent and promising uses to which such radiation has been placed have been that of sterilization and pasteurization. Radiosterilization of certain items having a medical utility, e.g., sutures and biologicals, has been practiced on a somewhat limited scale. Recently, however, efforts have been made with some success to employ this technique to sterilize or pasteurize food items. If this latter technique can be fully and economically developed, its widespread use would result in not only more acceptable preserved foodstuffs, but also in the more efficient utilization of available foodstuffs. Since radiation sterilization can be accomplished at or below room temperatures and does not increase to any extent the temperature of the material being treated, this type of sterilization is characterized as "cold sterilization" as contrasted with conventional thermal sterilization which requires that the temperature of the material be raised to a level which exceeds the thermal limit for pathogenic microorganisms present. Thermal sterilization or pasteurization affects the flavor and nutritive values of foodstuffs so treated, whereas radiation neither cooks the item nor affects thermolabile nutritive factors present in the item.

The promising potential of radiation to sterilize or pasteurize is somewhat tempered by the recognized difficulty of insuring that the items so treated have received the proper dosage. Too little dosage will result in an article which may be unsafe for its intended use and an overdose may adversely affect the item. It may be said that the latitude in the case of radiation treatment is less than that for thermal treatment. The dosage received by an item will depend on the intensity and type of radiation and the time of exposure to such radiation. The intensity of radiation produced by any source is not so constant as will permit reliance on exposure time to obtain the desired dosage. Time of exposure can normally be well controlled but occasionally there will be some variation in this factor. Effective utilization of high energy ionizing radiation in sterilization or pasteurization, therefore, depends in great part on either the development of technique to control precisely the dosage administered or the development of means which will accurately measure the dosage values received. Precise control of dosage appears to be out of the question because of the present inability to control the intensity of the economically practical sources of radiation. Dosage measurement means, on the other hand, are available which will accurately measure the dosage. For radiosterilization or radiopasteurization on a production scale such dosimeters must, in addition to being accurate, be inexpensive because of the large number of dosimeters which would be required which may, in some cases, be as high as one dosimeter per unit being treated and, further, such dosimeters must be easy to read.

One radiation detector which would meet the foregoing requirements and is particularly sensitive to dosages in the food pasteurization range, i.e., 50,000 to 1,000,000 rads is an air-saturated, aqueous solution of ferrous sulfate, cupric sulfate and sulfuric acid. Upon exposure to gamma radiation, this salt solution undergoes a detectable change in composition which has proven to be quite accurate in measuring radiation exposure. It is theorized that the gamma ray or other ionizing radiation forms hydrogen peroxide in the solution and the hydrogen peroxide molecule in turn reacts with a ferrous ion to yield a ferric ion. The increase in ferric ion concentration being related to the radiation dose absorbed. Ferric ion concentration in the solution can be determined by measuring the optical density of the solution with a spectrophotometer. Such ions have an absorbance maximum of 3040 A. This system has been used to a limited extent for laboratory purposes but has not been widely used because of the inherent instability of such solutions. Freshly prepared solutions are quite satisfactory but upon standing, the optical density undergoes a progressive change reflecting the oxidation-reduction reactions taking place in the system. During the first 100 hours of shelf-life at ambient conditions the optical density of this solution increases from 0.04 to 0.15. For a dose of 250,000 rads this could cause a reading as low as 210,000 rads.

It is, therefore, among the objects of this invention to provide a dosimeter for high energy ionizing radiation that is accurate, economical to use, easy to read and suitable for use over extended periods of time.

It is also among the objects of this invention to provide a radiation dosimeter consisting of an aqueous solution of ferrous sulfate, cupric sulfate salts and sulfuric acid capable of accurately detecting and reflecting the dose absorbed by the solution, which solution is stable for extended periods of time.

Further objects and the entire scope of applicability of the present invention will become apparent from the detailed description given hereinafter.

We have discovered that the heretofore unstable aqueous solutions of ferrous sulfate and cupric sulfate may be stabilized so that there is no substantial change in the optical density (opacity) of the solution for an extended period of time, e.g., at least two weeks. The stabilization of such solutions is achieved by irradiating freshly prepared solutions with high energy ionizing radiation in a preferred dosage range of from about 200,000 rads to about 400,000 rads. The resulting solutions are quite stable and undergo only minor changes in optical density with time, i.e., less than a 5% change in optical density over a four-week period. The ionizing radiation which may be used to stabilize the dosimeter solutions may be of the electromagnetic type, e.g., gamma rays from a $Co^{60}$ source or of the particle type, e.g., electrons from an electron beam generator such as a 2-million volt resonant transformer or a 2-million volt Van de Graaf accelerator. Following this stabilization procedure the salt solutions may be stored indefinitely until used. The minimum dosage of 200,000 rads has been found to increase the optical density of the solution to about 0.300. The following examples will illustrate in more detail the practice of this invention.

EXAMPLE I

A freshly prepared, aqueous, air-saturated solution of 0.001 M ferrous sulfate, 0.01 M cupric sulfate and 0.005 M sulfuric acid was placed in 1 sq. cm. quartz cells. Reagent grade chemicals and single distilled water were used in preparing the solutions. The optical density of the salt solutions was determined with a Beckman D.B. quartz spectrophotometer, with measurement taken at 3040 A. and temperature held at 25° C. The optical density of the freshly prepared solution is 0.040. Progressive changes in the optical density of this solution were measured over a period of hours. The results are shown in the curve in FIGURE 1, identified as unirradiated.

EXAMPLE II

A sample consisting of a freshly prepared solution of Example I was stabilized by exposure to gamma rays emanating from a $Co^{60}$ source and was given a dose of 200,000 rads. The average intensity of the radiation from the cobalt source was 60,000 rads per minute. The optical density of the irradiated solution was 0.300 and after two weeks the optical density was only 0.305 which is an insignificant change which would not affect the dosage measurement and is considered to be a highly stable dosimeter. Exposure of the same solution to a dosage level of 100,000 rads did not, on the other hand, produce a stable dosimeter and was of no value.

EXAMPLE III

Two additional samples of the solution of Example I were exposed to gamma radiation as in Example II. The first of these samples received a dose of 250,000 rads. The optical density of this irradiated material was 0.410 and the changes occurring in optical density for the following 150 hours were determined and the results are shown in the middle curve of FIGURE 1 of the drawing. The second sample received a dose of 370,000 rads and the initial optical density following radiation and at intervals up to 150 hours were determined and the results set forth in the uppermost curve of FIGURE 1. The two irradiated curves are essentially flat, illustrating the stability of these solutions, and can be contrasted with the steep curve of the unstable, unirradiated solution.

EXAMPLE IV

Figure 2:
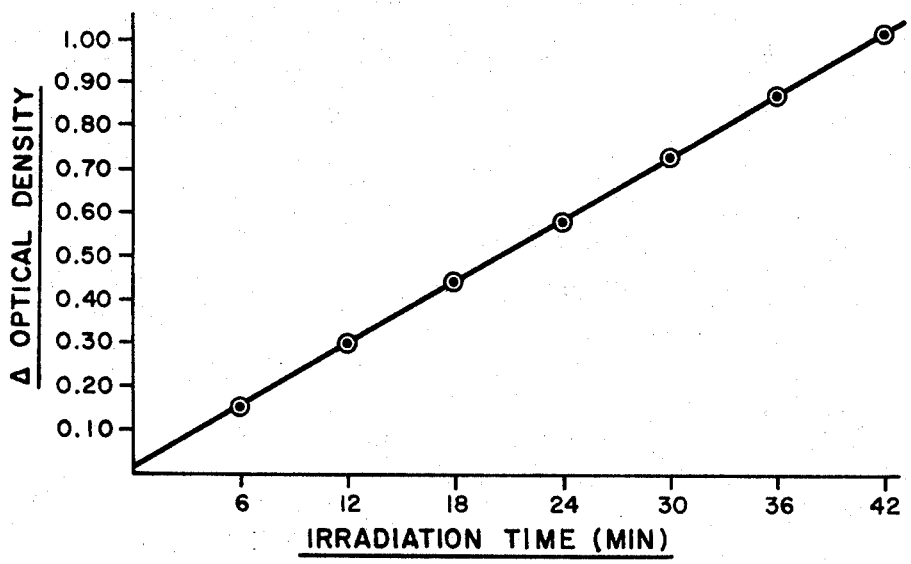

Samples of freshly prepared ferrous sulfate-cupric sulfate solutions of Example I received a 370,000 rad dose of gamma radiation. The stabilized dosimeter solutions were used to determine radiation dosage from a $Co^{60}$ source. FIGURE 2 depicts the dose response of the stabilized dosimeter solution. The change in optical density ($\Delta$ optical density) of the dosimeter is plotted against exposure time. The blank or reference is the stabilized dosimeter solution having an optical density of 0.600. The intensity of the radiation averaged 60,000 rads per minute. The curve in FIGURE 2 shows the linear response of the stabilized dosimeter solution to radiation exposure.

Ferrous sulfate-cupric sulfate solutions which are useful for measuring radiation dosage and which can be stabilized in accordance with our invention may be composed of from about 0.001 to about 0.01 M cupric sulfate, from about 0.001 to about 0.1 M ferrous sulfate and from about 0.005 to about 0.015 N sulfuric acid. These solutions when stabilized as herein disclosed are stable for a minimum of two weeks and are considered to be stable for all practical purposes for periods of up to three months. Stable solutions are defined as those which will not undergo a 5% change in the optical density over a 30-day period.

The dosage sensitivity of these stabilized solutions is excellent for measuring dosages in the range of 40,000 to 600,000 rads.

We claim:
1. A process for stabilizing an inherently unstable, air-saturated, aqueous solution consisting of from about 0.001 to about 0.01 M ferrous sulfate, from about 0.005 to about 0.015 N sulfuric acid and from about 0.001 to about 0.01 M cupric sulfate which process comprises irradiating said solution with high energy ionizing radiaton to the extent of from about 200,000 rads to about 400,000 rads.

2. A method according to claim 1 wherein said unstable solution consists of about 0.001 M ferrous sulfate, about 0.01 N sulfuric acid and about 0.01 M cupric sulfate.

3. A stable, air-saturated aqueous solution produced according to claim 1.

4. A stable, air-saturated aqueous solution produced according to claim 2.

References Cited

UNITED STATES PATENTS 2,936,372    5/1960    Balkwell et al. ___ 252—408 XR

OTHER REFERENCES

Hart: "Radiation Chemistry of Aqueous Ferrous Sulfate-Cupric Sulfate Solutions," in Radiation Research, vol. 2, No. 1, pp. 33–46 incl., February 1955.

LEON D. ROSDOL, *Primary Examiner.*

MAYER WEINBLATT, *Examiner.*